(12) United States Patent
Ruden et al.

(10) Patent No.: US 6,481,093 B1
(45) Date of Patent: Nov. 19, 2002

(54) AUTOMATED CLAMPRING INSTALLATION STATION

(75) Inventors: Shawn A. Ruden, Oklahoma City, OK (US); Roger A. Jessen, Norman, OK (US); James R. Jenkins, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 257 days.

(21) Appl. No.: 09/641,898

(22) Filed: Aug. 18, 2000

Related U.S. Application Data
(60) Provisional application No. 60/150,137, filed on Aug. 20, 1999.

(51) Int. Cl.$^7$ .............................................. G11B 5/127
(52) U.S. Cl. ................................ 29/603.03; 29/603.04; 29/603.07; 29/729; 29/737
(58) Field of Search ...................... 29/603.03, 603.04, 29/603.07, 603.12, 603.17, 729, 737; 360/99.12

(56) References Cited

U.S. PATENT DOCUMENTS

| | | | |
|---|---|---|---|
| 4,628,464 A | * 12/1986 | McConnell | .................. 29/729 |
| 4,630,344 A | 12/1986 | Boyle et al. | |
| 4,790,709 A | 12/1988 | Sakimori et al. | |
| 4,862,584 A | * 9/1989 | Budy et al. | .................... 29/737 |
| 4,865,512 A | 9/1989 | Kato | |
| 4,883,300 A | 11/1989 | Akagawa | |
| RE33,466 E | 12/1990 | Kato | |
| 5,323,530 A | 6/1994 | Goto et al. | |
| 5,333,080 A | * 7/1994 | Ridinger et al. | ......... 360/99.12 |
| 5,404,636 A | 4/1995 | Stefansky et al. | |
| 5,539,981 A | 7/1996 | Burcham et al. | |
| 5,732,458 A | * 3/1998 | Moir et al. | .............. 29/603.03 |
| 5,819,411 A | 10/1998 | Smith | |
| 5,877,571 A | * 3/1999 | Brooks | .................... 29/603.03 |
| 5,953,804 A | 9/1999 | Dragotta | |
| 6,041,488 A | * 3/2000 | Wang | ...................... 29/603.03 |
| 6,105,240 A | * 8/2000 | Chuang et al. | .......... 29/603.03 |
| 6,212,759 B1 | * 4/2001 | Liu et al. | ................. 29/603.03 |
| 6,418,612 B1 | * 7/2002 | Chuang et al. | .......... 29/603.03 |
| 6,427,318 B1 | * 8/2002 | Pfeiffer et al. | ........... 29/603.03 |

OTHER PUBLICATIONS

US 2002/0092351 A1; Jul. 18, 2002; Horning et al.*

* cited by examiner

Primary Examiner—David J. Walczak
Assistant Examiner—Khoa Huynh
(74) Attorney, Agent, or Firm—Fellers, Snider, et al.

(57) ABSTRACT

An automated clampring installation station for assembling a disc drive having a hardware dispensing assembly, a presentment assembly, and a positioning and attachment assembly having a transport and affixing assembly and a feature detection assembly. The hardware dispensing assembly stages hardware for pick-up by the positioning and attachment assembly. The component parts presentment places a clampring for pick-up by the positioning and attachment assembly. The feature detection assembly provides orientation information to the components transport and affixing assembly to compensate for orientation of the hardware to the clampring and the subsequent alignment of the hardware and the clampring to the disc drive, and thereafter driving the hardware through apertures in the clampring and in the disc drive to attach the clampring to the disc drive.

24 Claims, 7 Drawing Sheets

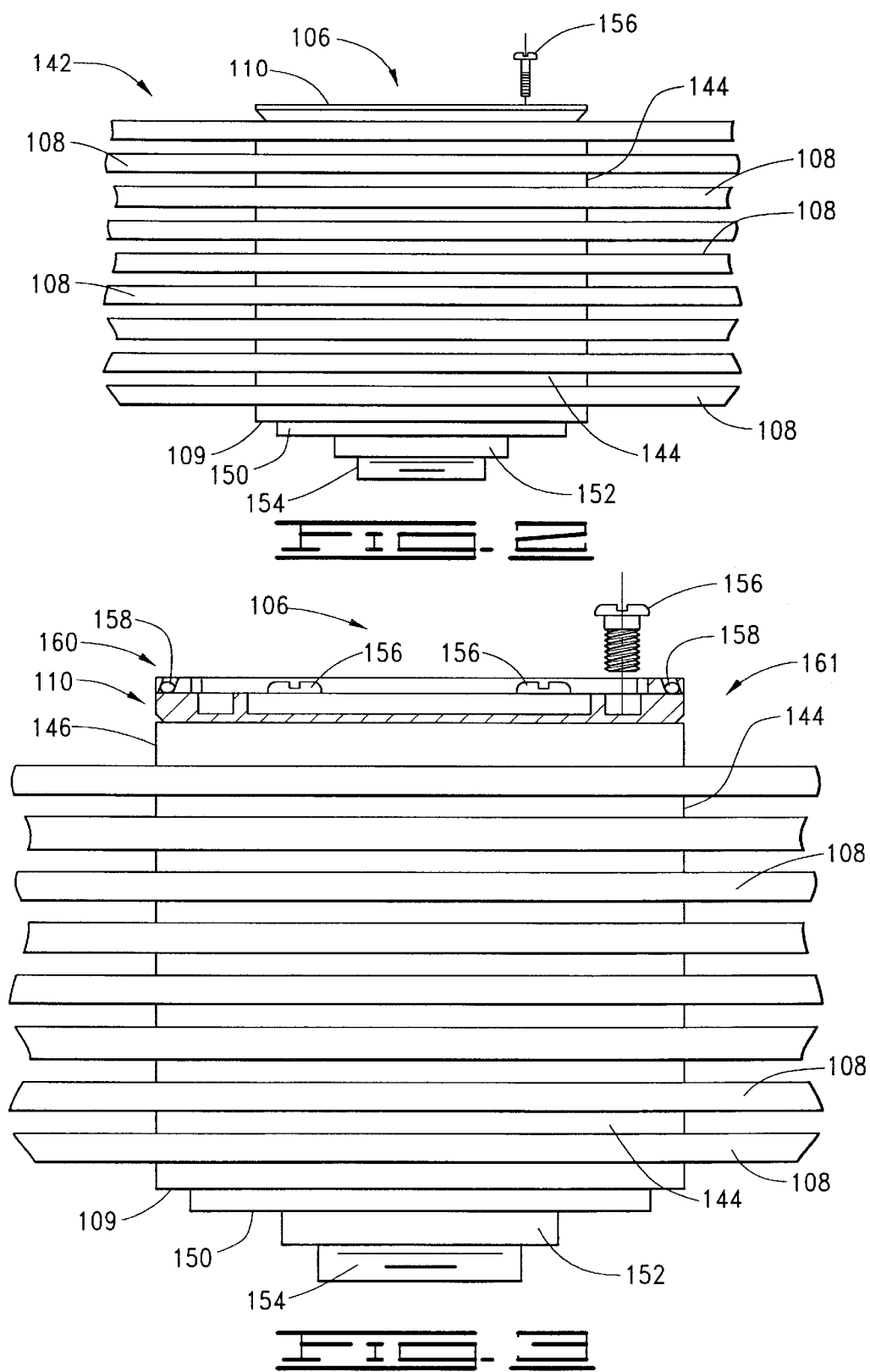

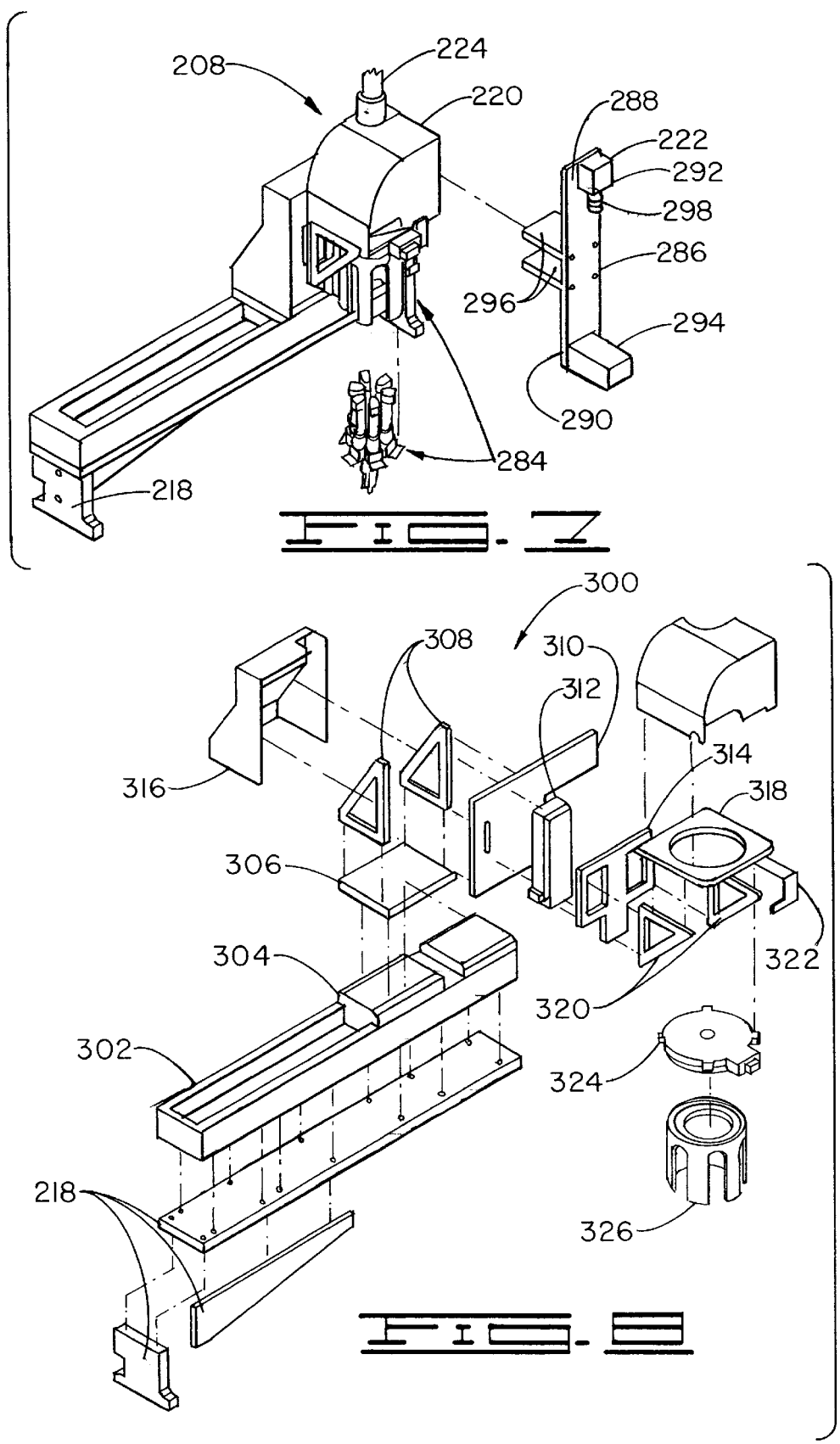

AUTOMATED CLAMPRING INSTALLATION STATION

RELATED APPLICATIONS

This application claims priority to U.S. Provisional Application No. 60/150,137 filed Aug. 20, 1999.

FIELD OF THE INVENTION

The present invention relates generally to the field of disc drive data storage devices, and more particularly, but not by way of limitation, to an automated assembly of a disc drive head-disc assembly which includes an automated clampring installation station.

BACKGROUND

Modern hard disc drives are commonly used in a multitude of computer environments, ranging from super computers through notebook computers, to store large amounts of data in a form that can be made readily available to a user. Typically, a disc drive comprises one or more magnetic discs that are rotated by a spindle motor at a constant high speed. The surface of each disc is a data recording surface divided into a series of generally concentric recording tracks radially spaced across a band having an inner diameter and an outer diameter. Extending around the discs, the data tracks store data within the radial extent of the tracks on the disc surfaces in the form of magnetic flux transitions induced by an array of transducers, otherwise commonly called read/write heads. Typically, each data track is divided into a number of data sectors that store fixed sized data blocks.

The read/write head includes an interactive element such as a magnetic transducer which senses the magnetic transitions on a selected data track to read the data stored on the track. Alternatively, the read/write head transmits an electrical signal that induces magnetic transitions on the selected data track to write data to the track.

As is known in the art, each read/write head is mounted to a rotary actuator arm and is selectively positionable by the actuator arm over a selected data track of the disc to either read data from or write data to the selected data track. The read/write head includes a slider assembly having an airbearing surface that causes the read/write head to fly above the disc surface. The air bearing is developed as a result of load forces applied to the read/write head by a load arm interacting with air currents that are produced by rotation of the disc.

Typically, a plurality of open-center discs and opencentered spacer rings are alternately stacked on the hub of a spindle motor, followed by the attachment of a clampring to form a disc pack. The hub, defining the core of the stack, serves to align the discs and spacer rings around a common centerline. Movement of the discs and spacer rings is typically constrained by a compressive load maintained by the clampring. The read/write heads mounted on a complementary stack of actuator arms, which compose an actuator assembly, commonly called an "E-block," accesses the surfaces of the stacked discs of the disc pack. The E-block also generally includes read/write head wires which conduct electrical signals from the read/write heads to a flex circuit which, in turn, conducts the electrical signals to a printed circuit board assembly (PCB). When the E-block is merged with the disc pack into a base deck and a cover is attached to the base deck a head-disc assembly (HDA) is formed. For a general discussion of E-block assembly techniques, see U.S. Pat. No. 5,404,636 issued to Stefansky et al., assigned to the assignee of the present invention.

The head-disc assembly (HDA) of a disc drive is typically assembled in a clean room environment. The need for maintaining a clean room environment (free of contaminants of 0.3 micron and larger) is to ensure the head-disc interface remains unencumbered and damage free. The slightest damage to the surface of a disc or read/write head can result in a catastrophic failure of the disc drive. The primary causes of catastrophic failure, particularly read/write head crashes (a non-recoverable, catastrophic failure of the disc drive) are generally characterized as contamination, exposure to mechanically induced shock, and non-shock induced damage. The source of non-shock induced damage is typically traced to the assembly process, and generally stems from handling damage sustained by the disc drive during the assembly process.

Several factors that bear particularly on the problem of assembly process induced damage are the physical size of the disc drive, the spacing of the components, the recording densities sought to be achieved and the level of precision to be maintained during the assembly process. The high levels of precision required in all of the assembly process are necessary to attain the operational tolerances required by the disc drive. The rigorous operational tolerances are in response to market demands that have driven the need to decrease the physical size of disc drive while simultaneously increasing disc drive storage capacity and performance characteristics.

Demands on disc drive mechanical components and assembly procedures have become increasingly more critical in order to support capability and size in the face of these new market demands. Part-to-part variation in critical functional attributes in the magnitude of a micro-inch can result in disc drive failures. Additionally, as disc drive designs continue to decrease in size, smaller read/write heads, thinner substrates, longer and thinner actuator arms, and thinner gimbal assemblies will continue to be incorporated into the drives, significantly increasing the need to improve the assembly processes to protect the read/write heads and discs from damage resulting from incidental contact between mating components. The aforementioned factors resultantly increase the difficulty of assembling disc drives. As the assembly process becomes more difficult, the need to invent new tools, methods, and control systems to deal with the emerging complexities pose unique problems in need of solutions.

Coupled with the size and performance improvement demands are further, market driven requirements for everincreasing fault free performance. The progression of continually decreasing disc thickness and disc spacing, together with increasing track density and increasing numbers of discs in the disc pack, has resulted in a demand for tools, methods and control systems of ever increasing sophistication. A result of the growth in demand for sophisticated assembling equipment has been a decreasing number of assembly tasks involving direct operator intervention. Many of the tasks involved in modem methods are beyond the capability of operators to reliably and repeatedly perform, further driving the need for automation equipment and tools.

In addition to the difficulties faced in assembling modem disc drives of high capacity and complex, physical product performance requirements have dictated the need to develop new process technologies to ensure compliance with operating specifications. The primary factor driving more stringent demands on the mechanical components and the assembly process are the continually increasing areal densities and data transfer rates of the disc drives.

The continuing trend in the disc drive industry is to develop products with ever increasing areal densities, decreasing access times and increasing rotational speeds. The combination of these factors places greater demands on the ability of modern servo systems to control the position of read/write heads relative to data tracks. The ability to assemble HDA nominally free from the effects caused by unequal load forces on the read/write heads, disc pack imbalance or one of the components of runout, velocity and acceleration (commonly referred to as RVA) posses a significant challenge as track densities increase. The components of RVA are: disc runout (a measure of the motion of the disc along the longitudinal axis of the motor as it rotates); velocity (a measure of variations in linear speed of the disc pack across the surface of the disc); and acceleration (a measure of the relative flatness of the discs in the disc pack).

By design, a disc drive typically has a discreet threshold level of resistance to withstand rotationally induced noise and instability, below which the servo system is not impaired. Also, a fixed range of load forces must be maintained on the read/write head to ensure proper fly height for data exchange. The primary manifestations of mechanically induced noise and instability are (1) vibration induced read/write head oscillation, (2) beat frequencies written into the servo signal at the servo write station and (3) non-repeatable runout. Oscillations are often introduced to the system via (1) deformations of the disc surface, (2) harmonics induced by disc pack imbalance, or (3) excessive surface accelerations encountered by the read/write head while flying on track or traversing the disc surface during track seeks.

Verification of disc pack compliance to the RVA specifications is crucial to the overall quality and long term reliability of the product. To ensure RVA compliance, measurements are taken to determine: (1) the amount of runout present in the disc pack, (2) absence of concave or convex disc profile as well as absence of a wavy disc profile across the surface of the discs, and (3) absence of a wavy disc profile around each track circumference.

The foregoing measurements require sophisticated measurement instruments and techniques. The complexities of the measurements render such measurements very difficult for an operator to perform, particularly at high assembly run rates. Specific problems arising out of operator executed or operator-assisted measurements include the frequency of damage to the discs and inconsistent and/or inaccurate measurement results obtained from a manually based measurement process. Both component damage and measurement errors occur from operator inability to maintain a sufficiently close interface with the measurement instruments as is demanded by the measurement process and associated instruments.

The operating performance of the disc drive servo system is affected by mechanical factors beyond the effects of mechanically induced read/write head oscillation from disc surface anomalies. Errors are traceable to disc pack imbalance and RVA noise sources. Even with improved approaches to the generation of position error signals in the disc drive servo system, the ability of the system to deal with such issues is finite. The limits of the servo system capability to reliably control the position of the read/write head relative to the data track must not be consumed by the noise present in the HDA resulting from the assembly process. Consumption of the available margin by the assembly process leaves no margin in the system to accommodate changes in the disc drive attributes over the life of the product. An inability to accommodate changes in the disc drive attributes leads to field failures and an overall loss in product reliability, a detrimental impact to product market position.

Although the servo system is that primarily affected by mechanically induced system noise, the disc drive read-write channel is equally dependent upon the mechanical integrity of the HDA. Issues regarding the inability of an oscillating read/write head to accurately read servo data also apply to read-write data. However, it is typical for read-write data to demonstrate a much lower signal to noise ratio than is present in the disc drive servo burst signals and gray code, thereby rendering read/write head capability in read data fields more susceptible to read errors. Read errors have frequently been traced to head-disc misalignments of the type causing a change in the fly height characteristics of the read/write head. Changes in fly height that increase the fly height cause the read/write head transducer to be located farther away from the data fields. The increased distance between the transducer and the data field imparts the perception of a decrease in data bit field strength relative to the background noise, resulting in an inability to read the data contained in the data field. Attempts to perform accurate measurements of head-disc misalignments, occurring as a result of disc pack tilt, have not been successful in manual head-disc merge operations. The inability to verify the presence of a head-disc misalignment during the read/write head-disc merge operation leads to rework of disc drives that subsequently fail in the disc drive production process. Reworking of disc drives exposes the disc drive, in particular the HDA, to increased handling, thereby increasing the probability of damage to the disc drive.

Components of modern disc drives have a relatively high susceptibility to damage induced through mechanical shock. One type of shock induced damage presented by prior merge operations deals with the problem of "head slap." Head slap is a term used to describe the dynamics of a read/write head, resting on a disc, in response to mechanically induced shock. The shock causes the read/write head to lift off the disc, and once off the disc the gimbal spring cants the read/write head as the force of the load arm drives the read/write head back to the disc. Typically, the first point of contact of the read/write head with a disc occurs that the owners of the read/write head. It is known that shocks of a load of greater than 20 grams for duration of 0.5 milliseconds or less will cause head slaps. It is also well known that the results of head slap often lead to read/write head crashes.

Taken in combination the above discussed factors—the tasks involved in assembling a modern disc drive exceeds the capability of manual assemblers; the susceptibility of the disc drive to damage during the assembly process; the level of precision assembly required by increasing areal densities; and the need to minimize adverse effects of mechanically induced noise on the disc drive servo system—have culminated to render prior disc drive assembly method archaic.

Thus, in general, there is a need for an improved approach to disc drive assembling technology, to minimize the potential of damage during assembly, to produce product that is design compliant and reliable, and to minimize mechanically induced system noise. More particularly, there is a need for an automated clampring installation station for installation of a clampring on a disc pack of a disc drive.

SUMMARY OF THE INVENTION

The present invention provides an automated clampring installation station for installing a component on a disc drive by picking, placing and attaching a component, for example a clampring, on a workpiece, for example a disc pack mounted in a base deck, by use of hardware, for example screws, during an automated assembly process. Included in the automated clampring installation station and attached to a frame are five major assemblies working in conjunction to achieve the assembly task assigned the automated assembly disc drive assembly station.

The first of the five major assemblies is a control computer that orchestrates the activities of the remaining four major assemblies. The second major assembly is a conveyor that responds to a workpiece delivery command from the control computer by delivering a hub and interleaved member parts into the automated clampring installation station. Once the hub and interleaved member parts is registered within a predetermined component attachment location within the station, the station control station commands the second major assembly, a hardware dispensing assembly to activate.

The hardware dispensing assembly responds to a command from the control computer by activating its hardware dispensing routine. Having activated the routine the hardware dispensing assembly automatically stags a predetermined required quantity of hardware, such as screws, in a predetermined geometric configuration within fixed hardware pick-up location to await pick-up and then self deactivates.

The third major assembly, a presentment assembly, is activated in conjunction with the hardware dispensing system by an activation command from control computer. The presentment assembly responds to a command from the control computer by activating its component parts feeding routine. Having activated the routine the presentment assembly automatically delivers a component, such as a clampring, to a predetermined awaiting pick-up location and then deactivates itself.

The fourth major assembly, a positioning and attachment assembly has two primary portions. A transport and affixing assembly and a feature detection assembly. The transport and affixing assembly responds to a hardware pick-up command from the control computer by moving to the transport and affixing assembly and picking up the hardware, for example six screws. As both the transport and affixing assembly and the feature detection assembly are attached to the same linear positioning arm they move in unison. Such that, while picking up the hardware, a digital video camera component of the feature detection assembly is automatically positioned above the predetermined awaiting pick-up location to analyzes the features of the component.

Having picked up the hardware, the component and hardware transport and affixing is repositioned above the predetermined awaiting pick-up location and then re-oriented to be in alignment with the component. The amount of re-orientation needed is based on the analysis of the component's features that were captured by the feature detection assembly. Having come into alignment, a command is issued by the control computer to pick up the component, such as the clampring. During pick-up of the component, the digital video camera component of the feature detection assembly automatically analyzes the features of the hub and interleaved member parts or disc pack.

Having picked up both the hardware and the component, the control computer commands the positioning and attachment assembly to first, move the component and hardware transport and affixing above the hub and interleaved member parts; second, orient the hardware and the component to be in alignment with the hub and interleaved member parts; and third, attach the component to the hub and interleaved member parts using the hardware. Upon completion and receipt of a release command from a conveyor control station, the control computer commands the release of the disc pack to the conveyor and issues a delivery command to the conveyor to deliver a new hub and interleaved member parts to the automated clampring installation station.

A benefit imparted to the disc drive by the automated clampring installation station is the minimization of two components of RVA. First, the minimization of encountering concave or convex disc profile or wavy disc profile across the surface of the discs and second, the minimization of encountering a wavy disc profile around each track circumference. The minimization of two of the three components of RVA results from the ability of the automated clampring installation station to simultaneously torque down the attachment screws.

BRIEF DESCRIPTION OF THE DRAWINGS

FIG. 2 is a partial, elevational view of the spindle motor of FIG. 1 having a plurality of discs and spacers mounted thereon, and clamped together by a clampring to form a disc pack.

FIG. 3A is an isometric view of a balance correction C-ring and the clampring of FIG. 2.

FIG. 3B shows a partial sectional of the clampring and a hardware piece of the type used by the disc drive assembly of FIG. 1.

FIG. 7 is a partial exploded isometric view of a positioning and attachment assembly of the automated clampring installation station of FIG. 4 revealing a transport and affixing assembly and a feature detection assembly of the positioning and attachment assembly.

FIG. 8 is a partial exploded isometric view of a robotic positioning subassembly of the transport and affixing assembly of FIG. 7.

DETAILED DESCRIPTION

Figure 1:
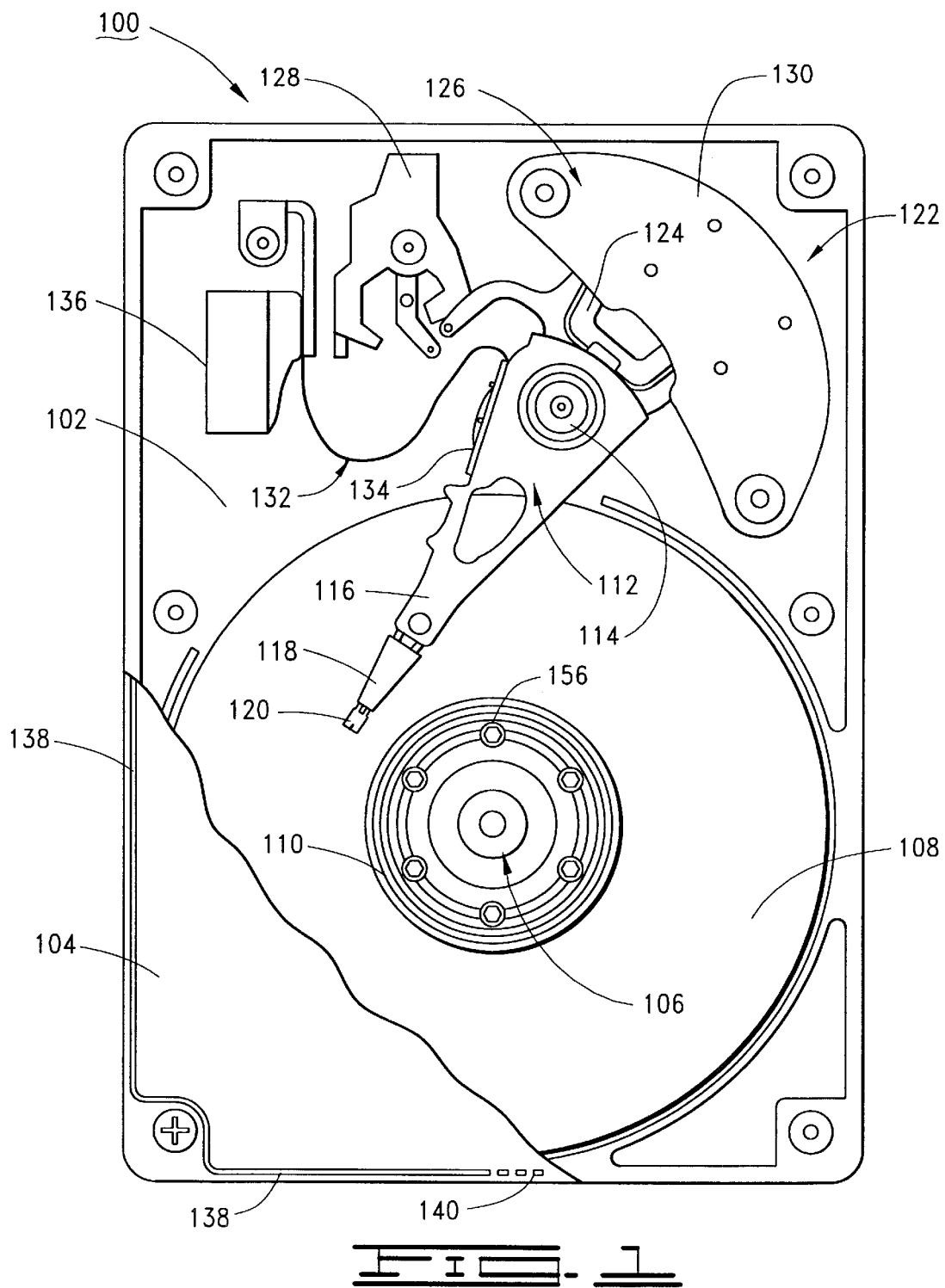
FIG. 1 is a top view of a disc drive of the type that is assembled by the automated clampring installation station of the present invention. The top cover is partially cutaway.

Referring to the drawings in general, and more particularly to FIG. 1, shown therein is a top view of a disc drive 100 constructed in accordance with the present invention. The disc drive 100 includes a base deck 102 to which various disc drive components are mounted, and a top cover 104, which together with the base deck 102 provides a sealed internal environment for the disc drive 100. The top cover 104 is shown in a partial cut-away fashion to expose selected components of interest. It will be understood that numerous details of construction of the disc drive 100 are not included in the following description as such are well known to those skilled in the art and are believed to be unnecessary for the purpose of describing the present invention.

Mounted to the base deck 102 is a spindle motor 106 to which a plurality of discs 108 are mounted and secured by a clampring 110 for rotation at a constant high speed. Adjacent the discs 108 is an actuator assembly 112 (sometimes also referred to as an "E-block") which pivots about a cartridge bearing 114 in a rotary fashion. The actuator assembly 112 includes actuator arms 116 (only one shown) that support load arms 118. Each load arm 118 in turn supports read/write heads 120, with each of the read/write heads 120 corresponding to a surface of one of the discs 108. As mentioned hereinabove, each of the discs 108 has a data recording surface divided into concentric circular data tracks, and the read/write heads 120 are positionably located over data tracks to read data from, or write data to, the tracks.

The actuator assembly 112 is controllably positioned by way of a voice coil motor assembly (VCM) 122, has an actuator coil 124 immersed in the magnetic field generated by a magnet assembly 126. A latch assembly 128 is disposed to latch the actuator assembly in a predetermined park position when the disc drive 100 is turned off. A magnetically permeable flux path such as a steel plate 130 (sometimes referred to as a pole piece 130) is mounted above the actuator coil 124 to complete the magnetic circuit of the VCM 122. When controlled DC current is passed through the actuator coil 124, an electromagnetic field is set up which interacts with the magnetic circuit of the VCM 122 to cause the actuator coil 124 to move relative to the magnet assembly 126 in accordance with the well-known Lorentz relationship. As the actuator coil 124 moves, the actuator assembly 112 pivots about the cartridge bearing assembly 114, causing the heads 120 to move across the surfaces of the discs 108 thereby allowing the heads 120 to interact with the data tracks of the discs 108.

To provide the requisite electrical conduction paths between the heads 120 and disc drive read/write circuitry (not shown), read/write head wires (not separately shown) are routed on the actuator assembly 112 from the heads 120, along the load arm 118 and the actuator arms 116, to a flex circuit 132. The read/write head wires are secured by way of a suitable soldering process to corresponding pads of a flex circuit printed circuit board (PCB) 134 of the flex circuit 132. The flex circuit 132 is connected to a flex circuit bracket 136 in a conventional manner, which in turn is connected through the base deck 102 to a disc drive PCB (not shown) mounted to the underside of the base deck 102. The disc drive PCB provides the disc drive read/write circuitry which controls the operation of the heads 120, as well as other interface and control circuitry for the disc drive 100.

To maintain the sealed internal environment for the disc drive 100, a seal gasket 138 is molded onto the top cover 104. Top cover 104 has a plurality of gasket attachment apertures 140 through which gasket material flows during the gasket molding process. A continuum of symmetrically formed gasket material is disposed on both the top surface and the bottom surface of top cover 104 and injected through the apertures 140. During the cure process the gasket material injected into the gasket attachment apertures 140 bonds the portion of the seal gasket adjacent the top surface of the top cover to the portion of the seal gasket adjacent the bottom portion of the top cover 104, thereby sealing the gasket attachment apertures 140 and forming the seal gasket 138. A gasket material found to be useful for this application is FLUOREL by the 3M company, specifically 3M FLUOREL, FE-5621Q.

FIG. 2 is an elevational view of a disc pack 142. Disc pack 142 is formed from stacked member parts comprising discs 108, spacer rings 144 and enlarged stack ring 146 (shown in outline form). A traditional disc pack is formed by alternately stacking discs 108 with spacer rings 144 on a spindle motor hub148, also referred to herein as a hub 148. The spindle motor hub 148 is attached to the spindle motor 106 via a motor housing 150 which supports an outer race 152, where the motor housing 150 and outer race 152 together spin freely around a stationary threaded shaft 154 by way of interior roller bearings (not shown) therebetween.

Upon completing the stacking of discs 108 interleaved with spacer rings 144, the clampring 110 is secured to the spindle motor hub 146 through use of hardware connectors 156 also referred to herein as connectors 156 or screws 156. The spindle motor hub 148 provides a component mounting surface (not separately shown) containing attachment apertures (not specifically shown). Each of the hardware connectors 156 engages a corresponding attachment aperture (not specifically shown) to secure the clampring 110 to the spindle motor hub 148 to complete the disc pack 142.

It should be noted that when constructing a disc pack, the first component placed on the spindle motor hub is a disc 108. However, the last stacked member part to be placed on the spindle motor hub 148 may either be the disc 108 or the enlarged spacer ring 146 (shown in dash lines). The enlarged stack ring has a diameter substantially equal to stack ring 144 and a thickness substantially equal to the sum of the thickness of stack ring 144 plus the thickness of the disc 108. Whether the last stacked member part is the disc 108 or the enlarged stack ring 146, the clampring 110 imparts a clamping or compressive force on the top surface of the last stacked member part to secure the discs 108 of the disc pack 142 in a fixed position through out the operational life of disc drive 100.

FIG. 3A is an isometric view of a balance correction C-shaped wire-ring 158 and the clampring 110 of FIG. 2. FIG. 3B contains a partial sectional of clampring 110 of FIG. 2 and an elevational view of one of the hardware connectors 156 used in the disc drive 100 of FIG. 1. As shown in FIGS. 3A and 3B, the clampring 110 has an annular balance correction containment cavity 160 along with a plurality of hardware ports 162 and a compressive force distribution surface 164, a relief surface 166 and a step portion 168. Each hardware port 162 directly corresponds to an attachment aperture (not shown) of the spindle motor hub 148. The force distribution surface 164 is elevated above the relief surface 166 by the step portion 168. The step portion has a thickness of about 0.006 inches. FIG. 3B further discloses the hardware connector 156 has a contact surface 170 and a thread engagement portion 172.

Each hardware connector 156 directly corresponds to one of the hardware ports 162. Thread engagement portion 172 of each hardware connector 156 passes through its corresponding hardware port 162 and engages a corresponding attachment aperture (not separately shown). Upon simultaneous application of a final torque force on each hardware connector 156, the contact surface 170 of the hardware connector 156 contacts the force distribution surface 164 and imparts a compressive force on the force distribution surface 164 while failing to make contact with relief surface 166. By confining the contact surface 170 to engagement with the force distribution surface 164 as the means of imparting the simultaneously applied compressive load developed by the finally applied torque force runout, velocity and acceleration (RVA) characteristics remain within those required by disc drive 100.

Runout of the discs 108 is a measure of the axial variation of the height of surfaces of the disc 108 around a circumferential arc of a specific radius. The velocity component is a measure of the rate of change of the axial displacement of the disc 108 surface around a circumferential arc of a specific radius. While the acceleration component of RVA is a measure of the rate of change of the disc 108 velocity around a circumferential arc of a specific radius.

Figure 4:
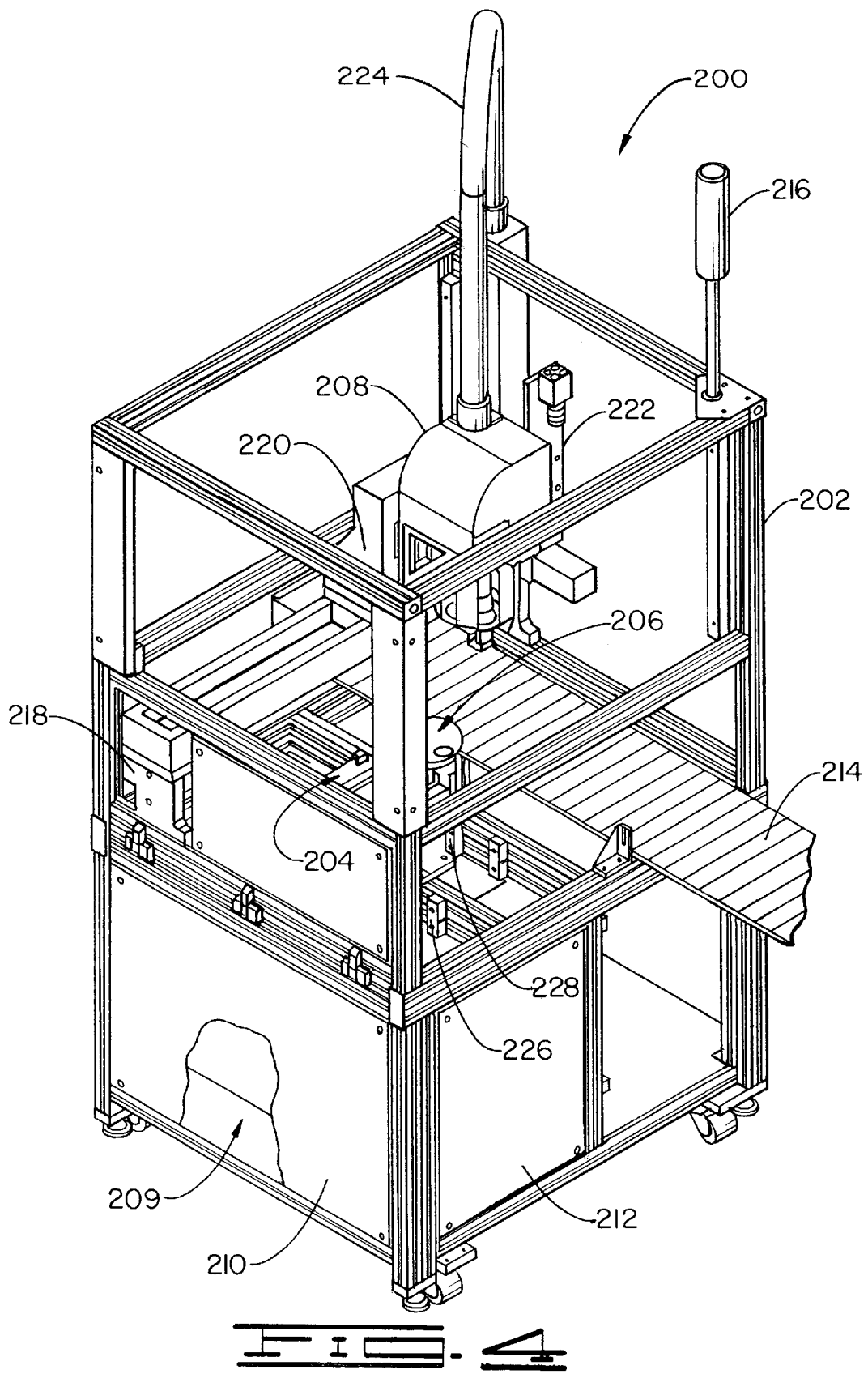
FIG. 4 is an isometric view of an automated clampring installation station for installing the clampring of FIG. 3A on the disc drive assembly of FIG. 1.

FIG. 4 shows an automated clampring installation station 200 for installing a component part, such as the clampring 110 on the disc drive 100. Shown therein are the following: a frame 202; a hardware dispensing assembly 204; a component presentment assembly 206, also sometimes referred to herein as the presentment assembly 206; a positioning and attachment assembly 208; a control computer 209; a control computer front access panel 210; a control computer side access panel 212; a conveyor 214 and a station status light pole 216. The station status light pole 216 alerts an automation line operator by flashing different colored lights depending on the then current operational status of the station 200.

The positioning and attachment assembly 208 has a connector 218 attached to the frame 202, and a transport and affixing assembly 220 is attached to the connector 218. The positioning and attachment assembly 208, further comprises a feature detection assembly 222 attached to the transport and affixing assembly 220, and a flexible power and air supply conduit 224. The supply conduit 224 has a first end attached to the frame 202 and a second end attached to the transport and affixing assembly 220.

The hardware dispensing assembly 204 further has an attachment portion 226 attached to the frame 202 to secure the hardware dispensing assembly 204 to the frame 202. The presentment assembly 206 has a coupling member 228 to secure the component presentment assembly 206 to the frame 202. As mentioned above, the positioning and attachment assembly 208 has the connector 218 attached to the frame 202 for connecting the positioning and attachment assembly 208 to the frame 202.

Figure 5:
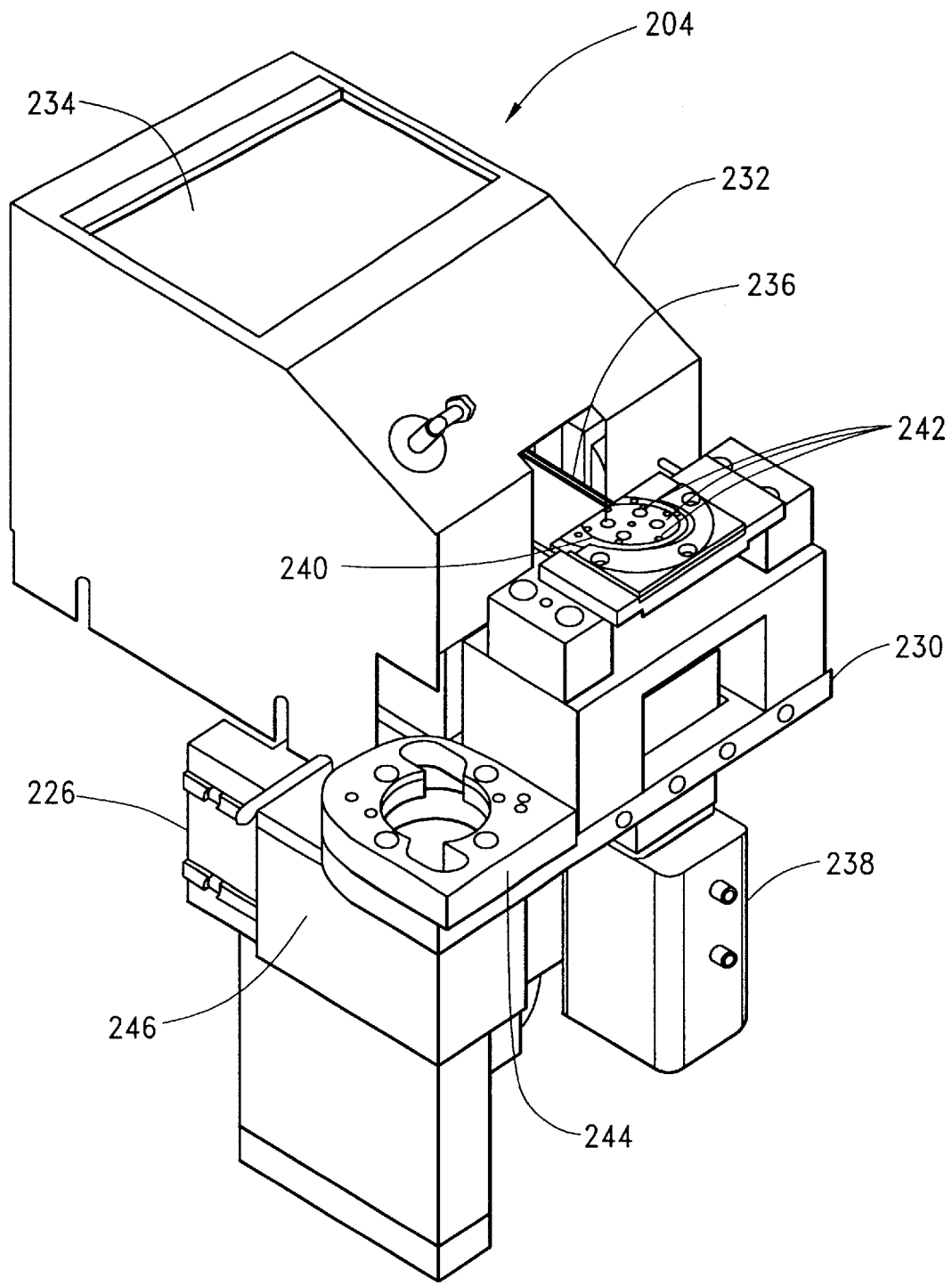
FIG. 5 is an isometric view of a hardware dispensing assembly for staging the hardware of FIG. 3A used by the automated clampring installation station of FIG. 4.

FIG. 5 shows the hardware dispensing assembly 204 of the disc drive assembly station 200. The hardware dispensing assembly 204 stages each hardware connector 156 used to secure the clampring 110 to the disc drive 100. Also shown in FIG. 5 is a mounting plate 230 attached to the attachment portion 226 (also shown in FIG. 4), and a pulsing hardware feed hopper 232 attached to the mounting plate 230. The hardware feed hopper 232 contains a hardware holding bin 234, which in turn contains a plurality of hardware connectors 156. The pulsing hardware feed hopper 232 is responsive to the control computer 209.

When the control computer 209 places a demand on the hardware feed hopper 232 for delivery of a quantity of the hardware connectors 156, the hardware feed hopper 232 responds by agitating the hardware holding bin 234. The agitation continues only for a time sufficient to supply the called for hardware connectors 156. The pulsing hardware feed hopper 232 has a hardware delivery chute 236 attached thereto, which serves to convey the transport hardware connectors 156.

The hardware dispensing assembly 204 of FIG. 5 has a hardware carousel motor 238 attached to the mounting plate 230, the hardware carousel motor 238 responsive to the control computer 209. The hardware carousel motor 238 has a drive shaft (not shown) on which a hardware carousel 240 is attached. The hardware carousel 240, which has a plurality of U-shaped hardware holding cavities 242, is positioned directly adjacent the hardware delivery chute 236. When the control computer 209 signals the hardware dispensing assembly 204 for delivery of the hardware connectors 156, and the hardware dispensing assembly 204 is energized to agitate the hardware holding bin 234 to discharge the required number of hardware connectors 156 to the delivery chute 236. While the hardware holding bin 234 is discharging one screw 156 into the hardware chute 236, the control computer signals the hardware carousel motor 238 to rotate the hardware carousel 240 such that one of the U-shaped hardware holding cavities 242 is positioned directly adjacent the hardware delivery chute 236. The hardware carousel awaits the delivery of the hardware connector 156. Once the hardware connector 156 is captured in the positioned hardware holding cavity 242, the control computer 209 signals the hardware dispensing assembly 204 to discontinue agitation of the hardware holding bin 234. This cycle is repeated to fill all of the hardware holding cavities 242 with hardware connectors 156.

The control computer 209 next verifies the presence or absence of a hardware connector 156 in each of the hardware holding cavities 242. If any of the hardware holding cavities 242 does not contain a hardware connector 156, the control computer repeats the hardware connector 156 dispensing cycle until each U-shaped hardware holding cavity 242 contains a hardware connector 156.

As shown in FIG. 5, the hardware dispensing assembly 204 has a torque mount 244 and a trash receptacle 246. The torque mount 244 is attached to the mounting plate 230 and supports a conventional electronic torque measurement device (not shown). The torque measurement device is used during station setup and station calibration. During normal station operations the torque mount 244 provides access to the trash receptacle 246. The trash receptacle 246 is attached to the mounting plate 230 and located directly below the torque mount 244. The trash receptacle 246 serves as a discharge point for defective hardware connectors 156.

Figure 6:
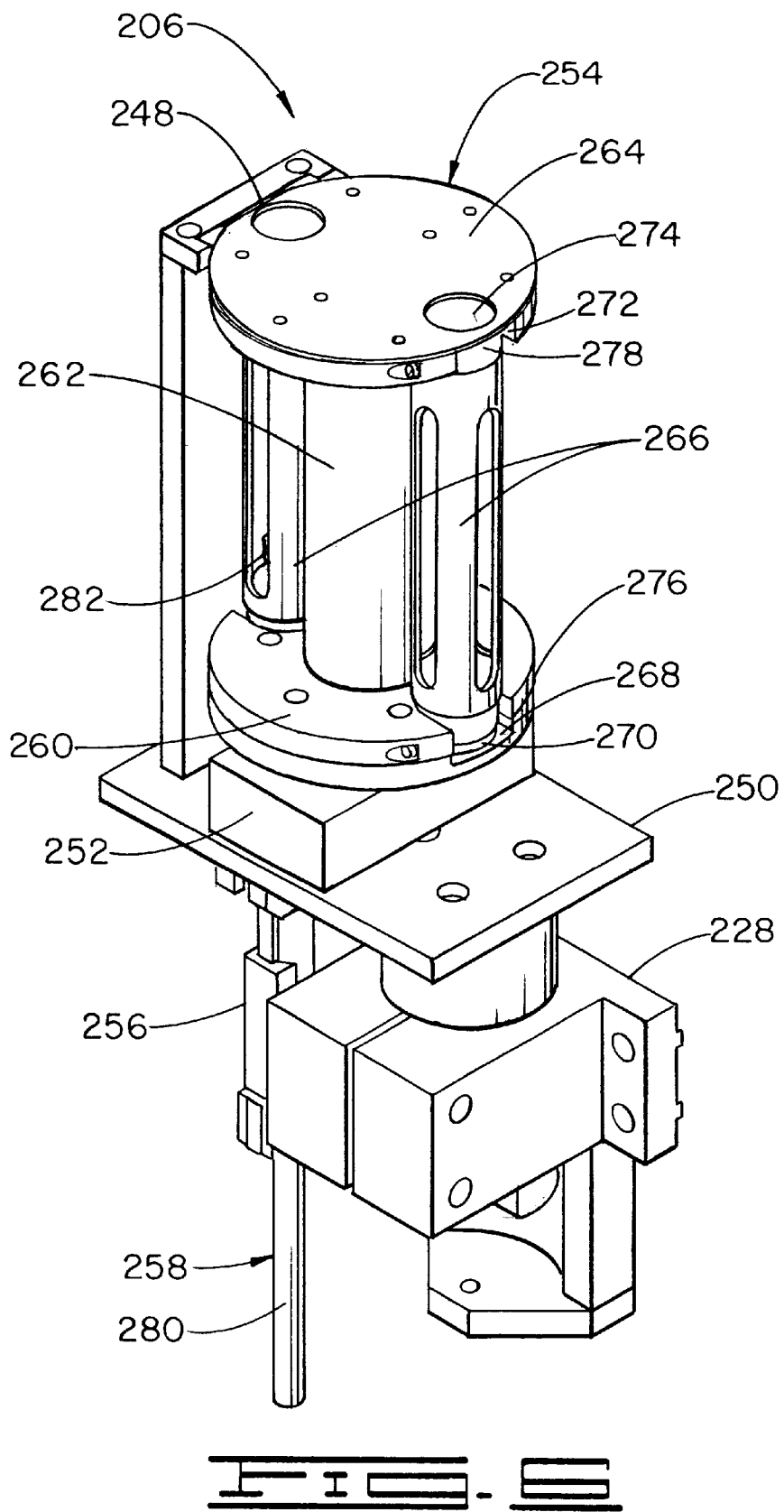
FIG. 6 is an isometric view of a presentment assembly of the automated clampring installation station of FIG. 4 for presenting the clampring of FIG. 3A within the automated clampring installation station of FIG. 4.

Referring now to FIG. 6, shown therein is the presentment assembly 206 of the disc drive assembly station 200 of FIG. 4. The presentment assembly 206 responds to an electronic signal from the control computer 209, which signals the need for one of the clamprings 110. In response thereto, the presentment assembly 206 presents one of the clamprings 110 for pick-up from a component pick-up location 248 for attaching to the disc pack assembly 142 of FIG. 2.

The presentment assembly 206 has a mounting base 250 attached to the coupling member 228 (see FIG. 4). Attached to the mounting base 250 is a clampring carousel motor 252, and attached to the clampring carousel motor 252 is an indexing clampring carousel 254. The presentment assembly 206 further includes a linear positioning motor 256 and a linear positioning member 258. The linear positioning motor 256 is attached to the mounting base 250 and provides the motion needed to position a component part (the clampring 110) at the component pick-up location 248. The linear positioning member 258 is slidingly attached on one end of the linear positioning motor 256. The linear positioning member 258 translates the motion provided by the linear positioning motor 256 into a vertical motion used in elevating the component part (the clampring 110) to the pick-up location 248.

The indexing clampring carousel 254 further has a bottom portion or member 260 attached to the clampring carousel motor 252; a separation tube 262 having a first end attached to the bottom member 260; a top member 264 attached to the distal end of the separation tube 262; and a plurality of removable open-ended component magazines 266 removably confined between the bottom member 260 and the top member 264.

The bottom 260 of the clampring carousel 254 has a plurality of component magazine receiving portions 268, each component magazine receiving portion 268 having a component positioning aperture 270 that provides access for the linear positioning member 258. The top member 264 having a plurality of component magazine containment portions 272, each containment portion 272 positioned directly opposed and corresponding to one of the component magazine receiving portions 268. Each containment portion 272 provides a component exit aperture 274, which is sized to permit passage of the clampring 110. The separation tube 262 is adjacent both the component magazine receiving portions 268 of the bottom member 260 and the component magazine containment portions 272 of the top member 264.

Each of the component magazines 266 has a lower magazine end 276 sized to prevent escapement of the clampring 110, but to allow passage of the linear positioning member 258. The component magazine receiving portions 268 confines the lower magazine end 276. Further, each component magazine 266 has an upper magazine end 278 sized to promote escapement of the clampring 110 as well as the passage of the linear positioning member 258. The component magazine containment portions 272 confine the upper magazine end 278. Each component magazine 266 is adjacent the separation tube 262 and contains a predetermined number of the clamprings 110.

Continuing with FIG. 6, the linear positioning member 258 has a first end 280, a second end (not shown) and a component part pusher contact 282, also sometimes referred to hereinafter as the component pusher contact 282. The first end 280 is slidingly attached to the linear positioning motor 256. The second end is adjacent the bottom member 260 and extendable through and retractable from each of the component positioning apertures 270. The member 282 is attached to the second end (not separately shown) of the linear positioning member 258. The member 282 contacts the bottom component part of a stack of component parts, such as clamprings 110, and in response to a signal from the control computer 209 indicating the need of a component part, such as a clampring 110, the component pusher contact 282 elevates to the component pick-up location 248 each of the component parts, such as the clampring 110, when each is called for by the control computer.

When the clamprings 110 are exhausted from a first component magazine 266, the linear positioning member is extracted from the indexing clampring carousel 254. Upon extraction of the linear positioning member 258, the control computer 209 commands the clampring carousel motor 252 to rotate the indexing clampring carousel 254 such that a second component magazine 266 is positioned directly beneath the component pick-up location 248.

Once the indexing clampring carousel 254 is positioned, the control computer 209 signals the linear positioning motor 256 to advance the linear positioning member 258 towards the component parts (the clamprings 110) stacked within the second component magazine 266. The linear positioning motor 256 advances the linear positioning member 258 to bring the member 282 into contact with a component part (the clampring 110), that is, into contact with the first of a stack of a plurality of clamprings 110, adjacent the component positioning aperture 270. The entire stack of clamprings 110 is confined by the component magazine 266.

Once contact between the member 282 and a first clampring 110 has been established, the linear positioning motor 256 deactivates and awaits a signal from the control computer 209 for delivery of the clampring 110, and upon receipt of the delivery signal, the member 282 proceeds to position the clampring 110 at the component pick-up location 248.

Turning to FIG. 7, shown therein is the positioning and attachment assembly 208 of the station 200 of FIG. 4. Also shown therein are the transport and affixing assembly 220 and the feature detection assembly 222. Further, FIG. 7 discloses the connector 218 as well as an end effector 284. For clarity the end effector 284 and the feature detection assembly 222 are shown detached from the transport and affixing assembly 220.

The feature detection assembly 222 comprises a vision system mounting bracket 286 attached to the transport and affixing assembly 220, the vision system mounting bracket 286 having a vision mount 288 and an illumination mount 290, a digital recognition portion 292 attached to the vision mount 288 and a light emitting diode light source 294 attached to the illumination mount 290.

The vision system mounting bracket 286 further has a counter balance mounting portion 296 attached to the vision system mounting bracket 286 substantially mid-way between the vision mount 288 and the illumination mount 290. The counter balance mounting portion 296 provides an attachment means for attaching the feature detection assembly 222 to the transport and affixing assembly 220.

The recognition portion 292, a commercially available unit such as a C-200 manufactured by Pulnix Corporation, comprises a digital video camera 298, for providing digital image signals of the orientation of defined features of a workpiece, such as the attachment apertures (not separately shown) of the disc drive 100, in relation to the end effector 284. The digital video camera 298 further provides image signals of an orientation of defined features, such as the orientation of the hardware port 162 of the clampring 110, in relation to the end effector 284.

The digital recognition portion 292 has a digital video signal cable (not shown) electrically connected to the digital video camera 298 for conducting digital image signals to a digital video capture board (not shown) mounted in the control computer 209. The digital video capture board receives the digital image signals for processing.

The digital recognition portion 292 has a pattern recognition software program supplied by Pulnix as part of the C-200 digital recognition product that is loaded on the station computer 209. The pattern recognition software program (not shown) processes the digital image signals and calculates position data such as the orientation of defined features of a workpiece. For example, features such as the orientation or position data of the attachment apertures (not separately shown) of the disc drive 100 in relation to the end effector 284, or the orientation or position data of the hardware port 162 of the clampring 10 in relation to the end effector 284. In the present instance, the position data comprises angular location and radial position data for the hardware ports 162 of the clamprings 110 and the angular location and radial position data for the attachment apertures of the disc pack 142.

The light emitting diode light source 292, attached to the illumination mount 290 of the vision system mounting bracket 286, provides a consistent light source for the digital recognition portion 292 during image capture functions.

Figure 9:
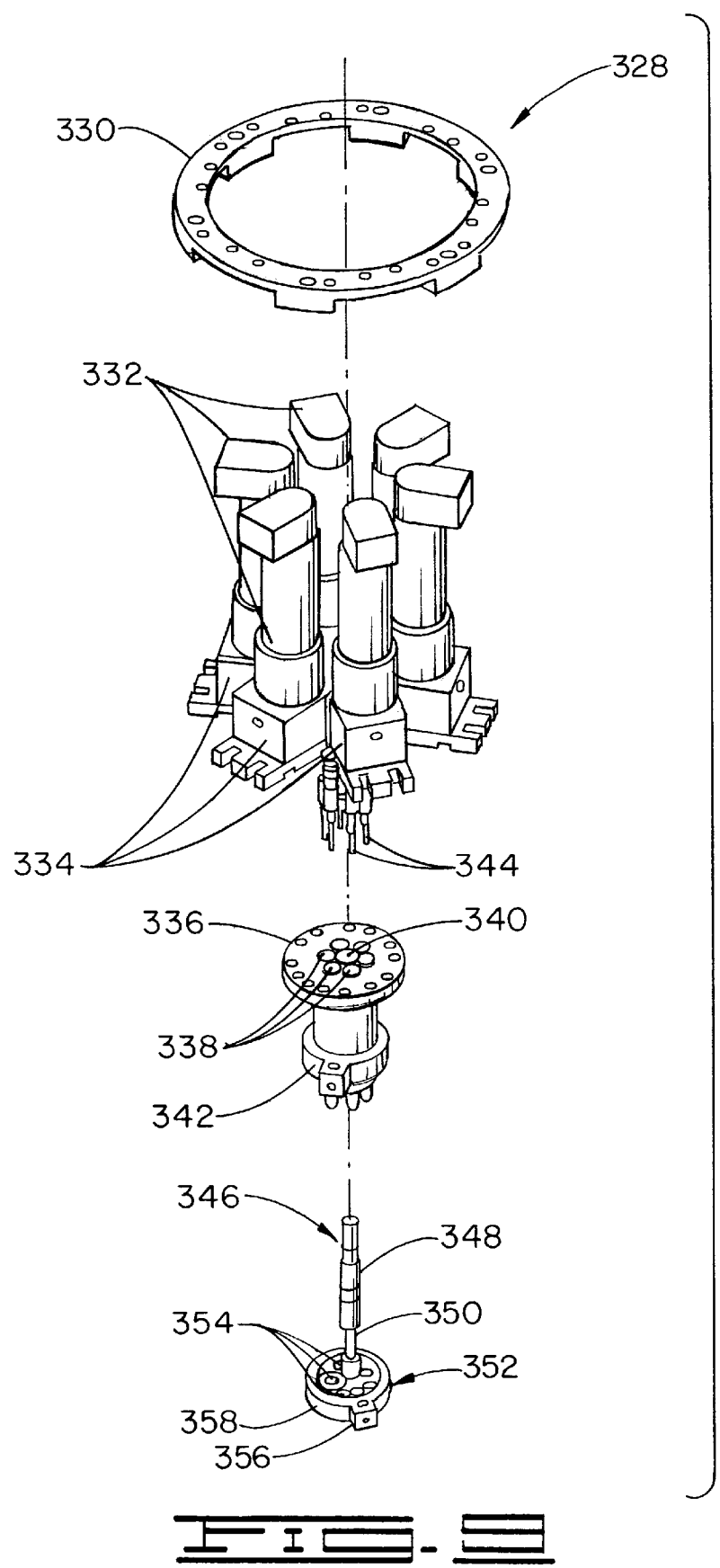
FIG. 9 is a partial exploded isometric view of a hardware gang driver end effector of the transport and affixing assembly of FIG. 7.

The transport and affixing assembly 220 of FIG. 7 has two primary subassemblies, the first disclosed by FIG. 8 and the second disclosed by FIG. 9. Shown in FIG. 8 is a robotic positioning subassembly 300 of the transport and affixing assembly 220. The robotic positioning subassembly 300 has:

a Y-axis linear positioning arm 302 with a programmable linear positioning platform 304; the Y-axis linear positioning arm 302 attached to the connection 218; a linear positioning plate assembly (not separately shown) attached to the programmable linear positioning platform 304 and a robot mount 306. The robot mount has a pair of robot gussets 308 attached to the robot mount 306 and a robot upright 310 attached to the robot gussets 308. The robotic positioning subassembly 300 has a Z-axis robotic arm 312 attached to the robot upright 310, an end effector coupling plate 314 attached to the Z-axis robotic arm 312 and a robotic cover 316 attached to the linear positioning plate assembly (not separately shown).

In FIG. 8, an end effector and attachment assembly (not separately shown) is attached to the end effector coupling plate 314 and has: a stepper motor support plate 318; a pair of triangular shaped support brackets 320 attached to the stepper motor support plate 318; a stepper motor sensor mount 322 attached to the stepper motor support plate 318; a low profile stepper motor 324 attached to the stepper motor support plate 318 and a gang-driver shell 326 attached to the low profile stepper motor 324. The low profile stepper motor 324 is of the type such as a NKS MEGATORQUE MOTOR similar in capability to the M-YS2005FN000 by NKS.

Not shown in FIG. 8, but a necessary member of the end effector and attachment assembly, is a programmable gang driver 328 shown in FIG. 9, the programmable gang driver 328 disclosed by the exploded view thereof. Included in the programmable gang driver 328 is a gang-driver mounting ring 330 attached to the gang-driver shell 326, and a plurality of programmable electric hardware drivers are attached to the gang-driver mounting ring 330.

The programmable gang driver 328 further has a plurality of torque transfer assemblies 334, each torque transfer assembly 334 attached to one of the programmable electric hardware drivers 332; a driver housing 336 attached to the torque transfer assemblies 334, the driver housing 336 having a plurality of drive bit apertures 338 wherein each drive bit aperture 338 corresponds to one each of the torque transfer assemblies 334. The driver housing 336 further has a component placement assembly aperture 340.

The programmable gang driver 328 also has a vacuum collet 342 attached to the driver housing 336 and a plurality of hardware driving bits or driving bits 344, each one of the hardware driving bits 344 passing through only one corresponding drive bit aperture 338 and attaches to only one corresponding torque transfer assembly 334. During the operation of the disc drive automation station 200 each hardware drive bit communicates with a hardware connector 156 and vacuum is applied to secure the screws 156 adjacent each corresponding hardware driving bit 344. Then, as each hardware connector 156 is driven into the spindle motor hub 148 a gravity activated retractable component placement assembly 346 secures the clampring 110 adjacent and stationary against the spindle motor hub 148 while the end effector and attachment assembly continues to descend toward or retract from the spindle motor hub 148. During operation of the disc drive automation station 200, the Z-axis robot 312 provides the vertical travel required by the end effector and attachment assembly (not separately shown), while the programmable gang driver 328 applies torque to the screws 156 thereby driving the screws 156 into the hub 148 and developing a compressive load on the clampring 160 that maintains the discs 108 in position over the life of the disc drive 100.

To assure smooth operation of the gravity activated retractable component assembly 346 guide bushing 348 is provided. The guide bushing 348 pressingly engages the component placement assembly aperture 340 and slidingly contains and supports a positioning shaft 350. The positioning shaft 350 accommodates the vertical travel of the driver housing 336. The gravity activated retractable component placement assembly 346 further has a component part gripper 352 with a plurality of hardware access apertures 354. The component part gripper is attached to the positioning shaft 350. Each hardware access aperture 354 is aligned with a single one of the corresponding drive bit aperture 338 and is sized to allow passage a single one corresponding hardware driving bit 344. The component part gripper 352 further has an integrated vacuum collar 356 integrated into a body 358. The vacuum collar 356 is used to grip a component part such as the clampring 110.

The Y-axis linear positioning arm 302 positions each of the hardware driver bits 344 substantially above each of the connectors 156 dispensed into the U-shaped hardware holding cavities 242. The Z-axis robotic arm 312 positions each hardware driver bit 344 adjacent the plurality of connectors 156 dispensed into the U-shaped hardware holding cavities 242, and the vacuum collet 342 applies negative pressure to secure each connector 156 dispensed in the U-shaped hardware holding cavities 242 against one each hardware driver bit 344. The Z-axis robotic arm 312 raises the vacuum collet 342, thereby extracting the connectors 156 from the hardware dispensing assembly 204.

The Y-axis linear positioning arm 302 further positions the gravity activated retractable component placement assembly 346 substantially above the pre-positioned clampring 110, and the Z-axis robotic arm 312 positions the integrated vacuum collar 356 adjacent the pre-positioned clampring 110. The integrated vacuum collar 356 applies negative pressure to secure the pre-positioned clampring 110 against the body 358. The Z-axis robotic arm 312 raises the vacuum collar 356, thereby extracting the pre-positioned clampring 110 from the presentment assembly 206.

The present invention provides a clampring installation station (such as 200) for use in the automated assembly of a disc drive (such as 100). The disc drive includes a spindle motor (such as 108) with an attached hub including a component mounting surface containing several attachment apertures and supporting a stack of interleaved member parts (such as the discs 108 and the spacer rings 144). A clampring (such as 110) provides a hardware aperture (such as 162) corresponding to each attachment aperture through which hardware connectors (such as 156), having a head (such as 170) and a threaded body (such as 172), are extending to engaging each attachment aperture to secure the clampring to the hub to produce a disc pack (such as 142).

In operation, the automated clampring installation station is activated via a control computer (such as 209) which signals a conveyor (such as 214) to deliver the hub and interleaved member parts to a predetermined component attachment location (not shown separately) for registration by the automated clampring installation station of the hub and interleaved member parts within the predetermined component attachment location. Then, a hardware dispensing assembly (such as 204) is activated to dispense hardware connectors (such as 156) into a hardware carousel (such as 240) and a component presentment assembly (such as 206) that presents the clampring to a component pick-up location portion (such as 248) in preparation for attachment to the hub. Next, a positioning and attachment assembly (such as 208) with a component transport and affixing assembly (such as 220) and a feature detection assembly (such as 222) are activated. The feature detection assembly collects rotational position information for the clampring and the hub during the assembly process, to assure alignment of the hardware connectors with the clampring and then the hub prior to attachment of the hardware connectors to the hub. The components transport and affixing assembly is positioned above the hardware carousel to simultaneously pick up each hardware connector while the feature detection system is positioned above the component pick-up location portion to record digital images of the clampring.

After gripping the hardware connectors, the feature detection assembly is positioned above the hub to record the orientation of the hub, and the components transport and affixing assembly is positioned above the component pick-up location portion. Based on the digital image data acquired by the feature detection assembly while positioned above the component pick-up location portion, a programmable gang-driver (such as 328) of an end effector and attachment assembly attached to a robotic positioning subassembly (such as 300) of the components transport and affixing assembly is rotated to align the hardware connectors with the hardware apertures of the clampring. Finally, the robotic positioning subassembly picks up the clampring, aligns the clampring, with the hardware body portion extending through hardware aperture of the clampring, and the hub by rotating the programmable gang-driver in compliance with the digital image of the hub gathered by the feature detection assembly while positioned above the hub.

It is clear that the present invention is well adapted to attain the ends and advantages mentioned as well as those inherent therein. While a presently preferred embodiment of the invention has been described for purposes of the disclosure, it will be understood that numerous changes can be made which will readily suggest themselves to those skilled in the art and which are encompassed within the spirit of the invention disclosed and as defined in the appended claims.

What is claimed is:

1. An automated clampring installation station for installing a component on a disc drive assembly comprising:
   a frame;
   a hardware dispensing assembly with an attachment portion attached to the frame;
   a component presentment assembly with a coupling member coupled to the frame;
   a positioning and attachment assembly comprising:
      a connector attached to the frame;
      a transport and affixing assembly attached to the connector, said transport and affixing assembly having an end effector attached to an end effector coupling plate, said end effector having a plurality of hardware apertures, wherein the end effector comprises:
         a low profile stepper motor attached to a stepper motor support plate supported by an end effector attachment assembly connected to the end effector coupling plate;
         a gang-driver shell attached to the low profile stepper motor supporting a gang-driver mounting ring having a programmable electric hardware driver communicating with each of a plurality of torque transfer assemblies;
         a driver housing attached to the plurality of torque transfer assemblies each supporting a driver bit and providing a component placement assembly aperture and a drive bit aperture corresponding to each of the plurality of torque transfer assemblies;
         a vacuum collet attached to the driver housing; and
         a gravity activated retractable component placement assembly pressingly engaging the component placement assembly aperture and providing a body, an integrated vacuum collar, and said plurality of hardware access apertures aligned with each of the driver bit; and
      a feature detection assembly attached to the transport and affixing assembly;
   wherein the component is a clampring having a plurality of hardware ports, each hardware port alignable simultaneously with one each of the plurality of the hardware access apertures.

2. The automated clampring installation station of claim 1 further having a control computer mounted to the frame, the control computer in communication with the hardware dispensing assembly, the presentment assembly and the positioning and attachment assembly.

3. The automated clampring installation station of claim 2 further comprising a conveyor secured to the frame and controlled by the control computer, the conveyor conveying the disc drive into and out of the automated clampring installation station.

4. The automated clampring installation station of claim 1 wherein the hardware dispensing assembly comprises:
   a mounting plate attached to the attachment portion;
   a pulsing hardware feed hopper attached to the mounting plate, the pulsing hardware feed hopper containing hardware connectors;
   a hardware delivery chute attached to the pulsing hardware feed hopper;
   a hardware carousel motor attached to the mounting plate and staging hardware connectors in a predetermined configuration;
   a hardware carousel attached to the hardware carousel motor, adjacent the hardware delivery chute, the hardware carousel having a plurality of U-shaped hardware holding cavities; and
   a trash receptacle attached to the mounting plate for depositing defective hardware connectors.

5. The automated clampring installation station of claim 4 wherein the hardware connectors are screws, the hardware delivery chute dispensing one of the plurality of screws into each of the plurality of U-shaped hardware holding cavities, the pulsing hardware feed hopper activated by absence of the screw from any of the plurality of U-shaped hardware holding cavities and deactivated by successfully dispensing one of the plurality of screws into each of the plurality of U-shaped hardware holding cavities.

6. The automated clampring installation station of claim 1, wherein the component part presentment assembly comprises:
   a mounting base attached to the coupling member;
   a clampring carousel motor attached to the mounting base; and
   an indexing clampring carousel attached to the clampring carousel motor, the indexing clampring carousel pre-positioning the component for pick-up by the transport and affixing assembly.

7. The automated clampring installation station of claim 6, wherein the indexing clampring carousel comprises:
   a bottom portion attached to the clampring carousel motor and having a plurality of component magazine receiving portions with component positioning apertures;
   a separation tube having a first end attached to the bottom portion and adjacent the component magazine receiving portions;

a top portion attached to the distal end of the separation tube and having a component magazine containment portion with an exit aperture corresponding to each component magazine receiving portion;

a plurality of removable open-ended component magazines supported by the component magazine containment portions and containing a predetermined number of the component;

a linear positioning motor attached to the mounting base; and a linear positioning member having a first end attached to the linear positioning motor, the linear positioning member pre-positioning each component.

8. The automated clampring installation station of claim 1 wherein the transport and affixing assembly further comprises:

a Y-axis linear positioning arm with a programmable linear positioning platform;

a linear positioning plate assembly attached to the programmable linear positioning platform;

a Z-axis robotic arm attached to the linear positioning plate assembly; wherein the end effector coupling plate attached to the Z-axis robotic arm; and a robotic cover attached to linear positioning plate assembly.

9. The automated clampring installation station of claim 8, wherein the linear positioning plate assembly comprises:

a robot mount;

a pair of robot gussets attached to the robot mount; and a robot upright attached to the robot gussets.

10. The automated clampring installation station of claim 8, wherein the hardware dispensing assembly includes a plurality of screws supported by a plurality of U-shaped hardware holding cavities, the U-shaped hardware holding cavities supported by the attachment portion, the Y-axis linear positioning arm positions the end effector adjacent the U-shaped hardware holding cavities, the Z-axis robotic arm positions each of the plurality of driver bits adjacent each of the plurality of screws dispensed within each of the plurality of U-shaped hardware holding cavities, the vacuum collet applying negative pressure to secure each one of the plurality of screws against one each of the driver bits, the Z-axis robotic arm raises the end effector thereby extracting each one of the plurality of screws from the hardware dispensing assembly.

11. The automated clampring installation station of claim 8, wherein, the component part presentment assembly includes an indexing clampring carousel pre-positioning the clampring, the Y-axis linear positioning arm positions a gravity activated retractable component placement assembly of the end effector substantially adjacent the pre-positioned clampring, the Z-axis robotic arm positioning the integrated vacuum collar adjacent the pre-positioned clampring, the vacuum collar applying negative pressure securing the pre-positioned clampring against the body, the Z-axis robotic arm raises the end effector extracting the pre-positioned component from the presentment assembly.

12. The automated clampring installation station of claim 1 wherein the feature detection assembly comprises:

a vision system mounting bracket having a first end and a second end and a counter balance mounting portion substantially mid-way between the first end and the second end, the counter balance mounting portion attached to the linear positioning plate assembly;

a recognition portion attached to the first end of the vision system mounting bracket; and a light emitting diode light source attached to the second end of the vision system mounting bracket, the light source aligned with the recognition system.

13. The automated clampring installation station of claim 12, wherein the recognition portion comprises:

a video camera, the video camera providing image signals;

a video signal cable electrically connected to the video camera, the video signal cable conducting image signals;

a video capture board electrically connected to the video signal cable, the video capture board receiving the image signals and electronically communicating those signals to the transport and affixing assembly; and a pattern recognition software program loaded on the video capture board, the pattern recognition software program processes the image signals and calculates position data.

14. The automated clampring installation station of claim wherein the position data comprises angular location and radial position data for the plurality of hardware ports, the low profile stepper motor rotates the plurality of hardware access apertures to align each of the plurality of hardware access apertures with one each of the plurality of hardware ports.

15. A disc drive assembly having a spindle motor with an attached hub with a plurality of attachment apertures and supporting a stack of interleaved members, a clampring having hardware apertures alignable with the attachment apertures, screws extending through the hardware apertures and engaging corresponding attachment apertures to secure the interleaved members to the hub, the disc drive assembly formed by steps comprising:

(a) providing the hub and interleaved members to a clampring installation station;

(b) grasping the pre-positioned screws from a hardware dispensing assembly utilizing a component transport and affixing assembly wherein the hardware dispensing assembly comprises:

a mounting plate;

a pulsing hardware feed hopper attached to the mounting plate, the pulsing hardware feed hopper containing a plurality of the screws;

a hardware delivery chute attached to the pulsing hardware feed hopper;

a hardware carousel motor attached to the mounting plate, the hardware carousel motor staging screws in a predetermined configuration;

a hardware carousel supporting a plurality of U-shaped hardware holding cavities, the hardware carousel attached to the hardware carousel motor and adjacent the hardware delivery chute; and a trash receptacle attached to the mounting plate for depositing defective screws.

(c) aligning the screws responsive to hardware aperture orientation data provided by a feature detection system;

(d) gripping a clampring from a component part presentment assembly utilizing the component transport and affixing assembly; and (e) positioning the clampring responsive to attachment aperture orientation data provided by the feature detection system while driving the screws into the attachment apertures of the hub.

16. The disc drive assembly of claim 15 wherein the component transport and affixing assembly includes a Y-axis linear positioning arm with a programmable linear positioning platform supporting a linear positioning plate assembly having a Z-axis robotic arm supporting an end effector, and wherein the component part presentment assembly includes a mounting base supporting a clampring carousel that drives an indexing clampring carousel pre-positioning the component for pick-up by the transport and affixing assembly, and further wherein the feature detection system includes a vision system mounting bracket attached to the linear positioning plate assembly and supporting a recognition portion attached to a first end of the vision system mounting bracket and a light source attached to a second end of the vision system mounting bracket, the light source aligned with the recognition system.

17. The disc drive assembly of claim 16 wherein the last stacked member is selected from the group consisting of an open centered disc and an open centered stack ring.

18. A method for installing a clampring with screws on a stack of interleaved member parts supported by a hub attached to a spindle motor of a basedeck to form a disc pack of a disc drive assembly by steps comprising:
(a) providing the hub and interleaved member parts thereon to a clampring installation station, the hub providing a plurality of attachment apertures for engaging the screws, and the clampring providing hardware apertures allowing the screws to extend through the clampring wherein the providing step (a) further comprises:
  (a1) activating the automated clampring installation station via a control computer;
  (a2) signaling a conveyor to convey the hub and interleaved member parts to a predetermined component attachment location within the automated clampring installation station;
  (a3) conveying the hub and interleaved member parts to the predetermined component attachment location; and
  (a4) registering the hub and interleaved member parts within the predetermined component attachment location thereby providing the hub and interleaved member parts;
(b) grasping the screws from a hardware dispensing assembly utilizing a component transport and affixing assembly;
(c) aligning the screws consistent with hardware aperture orientation data provided by a feature detection system and extending the body of the screw through hardware apertures;
(d) gripping the clampring from a component part presentment assembly utilizing the component transport and affixing assembly; and
(e) positioning the clampring consistent with attachment aperture orientation data provided by the feature detection system while driving the screws into the attachment apertures of the hub to form the disc pack.

19. The method of claim 18 wherein the grasping step (b) further comprises:
(b1) energizing a pulsing hardware feed hopper of the hardware dispensing assembly with an initialization signal from the control computer;
(b2) agitating a hardware holding bin of the pulsing hardware feed hopper to release one of the screws into a hardware delivery chute of the hardware dispensing assembly;
(b3) sliding the screw down the delivery chute and into a first available U-shaped hardware holding cavity of a hardware carousel of the hardware dispensing assembly;
(b4) rotating the hardware carousel to position a next available U-shaped hardware holding cavity adjacent the hardware delivery chute;
(b5) agitating the hardware holding bin for release and delivevy of the next screw through the hardware delivery chute and into the next available U-shaped hardware holding cavity; and
(b6) repeating the steps (b1) through (b5) until each available U-shaped hardware holding cavity contains one of the screws.

20. The method of claim 19 wherein the grasping step (b) additionally comprises:
(b7) verifying, utilizing the control computer, a presence of each of the screws within each of the available U-shaped hardware holding cavities;
(b8) initializing a component transfer and affixing assembly by signaling the component transfer and affixing assembly with the control computer;
(b9) positioning drive bits of a programmable gang driver of an end effector of a robotic positioning assembly of the transfer and affixing assembly adjacent the screws in a U-shaped hardware containment cavities;
(b10) applying a vacuum to secure the screws adjacent each corresponding drive bit of the programmable gang driver;
(b11) retracting the programmable gang driver from the hardware carousel thereby grasping the screws from the hardware dispensing assembly.

21. The method of claim 20 wherein the aligning step (c) further comprises:
(c1) positioning a feature detection assembly adjacent the clampring in a component pick-up location of a component part presentment assembly;
(c2) gathering angular and rotational location data for the hardware apertures of the clampring using the feature detection assembly;
(c3) repositioning the programmable gang driver and screws adjacent the component pick-up location; and
(c4) rotating the programmable gang driver to align the screws with the hardware apertures, the number of degrees of rotation based on the angular and rotational location data gathered by the feature detection assembly, the programmable gang driver rotated by a motor mounted in the end effector aligning the screws consistent with the hardware aperture orientation data.

22. The method of claim 21 wherein the gripping step (d) further comprises:
(d1) passing the screws through the corresponding hardware apertures using as Z-axis robotic arm attached to the end effector;
(d2) placing a component part gripper of the end effector adjacent the clampring using as Z-axis robotic arm;
(d3) applying vacuum through a vacuum collar of the end effector to secure the clampring adjacent the component part gripper; and
(d4) retracting the end effector with the clampring and screws from the component part presentment assembly gripping the clampring from the component part presentment assembly.

23. The method of claim 22 wherein the positioning step (e) further comprises:
(e1) deploying the feature detection assembly adjacent the hub within the predetermined component attachment location of the automated clampring installation station;

(e2) collecting attachment apertures orientation data for the attachment apertures of the hub using the feature detection assembly;

(c3) moving the programmable gang driver with the clampring and screws adjacent the hub within the predetermined component attachment location;

(c4) turning the programmable gang driver with the clampring and screws to align the screws with the attachment apertures, the number of degrees the programmable gang driver turns based on the attachment apertures orientation data gathered by the feature detection assembly, the programmable gang driver turned by the motor mounted in the end effector aligning the screws consistent with the attachment apertures orientation data;

(e5) pressing the clampring adjacent the hub using the component part gripper of the end effector;

(e6) engaging the attachment apertures with the screws;

(e7) applying torque to each screw with a corresponding programmable electric hardware driver attached to a corresponding torque transfer assembly of the programmable gang driver;

(e8) driving each screw adjacent the clampring to a predetermined torque; and (e9) developing a compressive load on the clampring forming the disc pack of the disc drive.

24. A disc drive assembly comprising:

a disc pack with a clampring; and means for automatically attaching the clampring to the disc pack.

* * * * *